United States Patent
Hanif et al.

(10) Patent No.: US 8,040,792 B2
(45) Date of Patent: Oct. 18, 2011

(54) TECHNIQUES FOR DETERMINING LOCAL REPAIR CONNECTIONS

(75) Inventors: Mohammad Hanif, Pleasanton, CA (US); Ivy Hsu, Pleasanton, CA (US)

(73) Assignee: Foundry Networks, LLC, San Jose, CA (US)

( * ) Notice: Subject to any disclaimer, the term of this patent is extended or adjusted under 35 U.S.C. 154(b) by 168 days.

(21) Appl. No.: 11/833,168

(22) Filed: Aug. 2, 2007

(65) Prior Publication Data

US 2009/0292943 A1    Nov. 26, 2009

(51) Int. Cl.
*G01R 31/08* (2006.01)
(52) U.S. Cl. .................. 370/218; 709/239; 370/228
(58) Field of Classification Search .......... 370/216, 370/218, 401, 228, 24, 255, 258; 709/239, 709/224–226, 243
See application file for complete search history.

(56) References Cited

U.S. PATENT DOCUMENTS

| | | | |
|---|---|---|---|
| 5,251,205 A * | 10/1993 | Callon et al. | |
| 6,311,288 B1 | 10/2001 | Heeren et al. | |
| 6,628,649 B1 * | 9/2003 | Raj et al. | |
| 6,697,329 B1 * | 2/2004 | McAllister et al. | |
| 6,711,152 B1 * | 3/2004 | Kalmanek et al. | 370/351 |
| 6,813,242 B1 * | 11/2004 | Haskin et al. | |
| 6,882,647 B2 * | 4/2005 | McAllister et al. | |
| 6,895,441 B1 * | 5/2005 | Shabtay et al. | |
| 6,904,018 B2 * | 6/2005 | Lee et al. | |
| 6,914,912 B1 * | 7/2005 | Kasamatsu | |
| 6,982,951 B2 * | 1/2006 | Doverspike et al. | |
| 6,987,727 B2 * | 1/2006 | Fredette et al. | |
| 7,058,845 B2 * | 6/2006 | Fujita | |
| 7,088,679 B2 * | 8/2006 | Behzadi | |
| 7,093,027 B1 * | 8/2006 | Shabtay et al. | |
| 7,120,118 B2 * | 10/2006 | Rajagopal et al. | |
| 7,133,358 B2 * | 11/2006 | Kano | |
| 7,164,652 B2 * | 1/2007 | Puppa et al. | |
| 7,180,866 B1 * | 2/2007 | Chartre et al. | |
| 7,209,434 B2 * | 4/2007 | Kano et al. | |
| 7,230,913 B1 * | 6/2007 | Vasseur et al. | |

(Continued)

FOREIGN PATENT DOCUMENTS

WO     WO 2003/071745 A1     8/2003

OTHER PUBLICATIONS

U.S. Appl. No. 11/833,167, filed Aug. 3, 2007, Bhat et al.*

(Continued)

*Primary Examiner* — Derrick Ferris
*Assistant Examiner* — Matthew Hopkins
(74) *Attorney, Agent, or Firm* — Kilpatrick Townsend & Stockton LLP

(57) ABSTRACT

Techniques for configuring a local repair connection for a protected connection including determining a path for the local repair connection. The path traversed by a local repair connection starts at a node in the path associated with the protected connection and ends at a merge point node in the path associated with the protected connection that is downstream from the start node. In one embodiment, the merge point node may even be more than two hops downstream from the start node in the path associated with the protected connection. The local repair path may include zero or more nodes that are not included in the path associated with the protected connection. Techniques are also described for optimizing the path associated with a local repair connection.

11 Claims, 4 Drawing Sheets

U.S. PATENT DOCUMENTS

| | | | |
|---|---|---|---|
| 7,233,569 B1 * | 6/2007 | Swallow | |
| 7,406,032 B2 * | 7/2008 | Li et al. | 370/217 |
| 7,586,841 B2 | 9/2009 | Vasseur | |
| 2002/0112072 A1 * | 8/2002 | Jain | |
| 2003/0063613 A1 * | 4/2003 | Carpini et al. | 370/401 |
| 2003/0090995 A1 * | 5/2003 | Illikkal et al. | 370/222 |
| 2004/0004938 A1 | 1/2004 | Buddhikot et al. | |
| 2004/0109687 A1 * | 6/2004 | Park et al. | |
| 2005/0088965 A1 * | 4/2005 | Atlas et al. | |
| 2005/0094554 A1 * | 5/2005 | Nakash | |
| 2005/0188100 A1 * | 8/2005 | Le Roux et al. | 709/238 |
| 2006/0067217 A1 * | 3/2006 | Li et al. | 370/230 |
| 2006/0146696 A1 * | 7/2006 | Li et al. | 370/218 |
| 2006/0171316 A1 * | 8/2006 | El-Sakkout et al. | 370/235 |
| 2006/0171320 A1 * | 8/2006 | Vasseur et al. | 370/238 |
| 2007/0011284 A1 | 1/2007 | Le Roux et al. | |
| 2007/0038767 A1 * | 2/2007 | Miles et al. | |
| 2007/0070883 A1 * | 3/2007 | Lysne et al. | 370/218 |
| 2007/0091795 A1 * | 4/2007 | Bonaventure et al. | |
| 2007/0165515 A1 * | 7/2007 | Vasseur | |
| 2007/0174483 A1 * | 7/2007 | Raj et al. | |
| 2007/0177506 A1 * | 8/2007 | Singer et al. | 370/235 |
| 2008/0049622 A1 * | 2/2008 | Previdi et al. | 370/237 |
| 2008/0219153 A1 * | 9/2008 | Shand et al. | 370/225 |
| 2008/0253281 A1 * | 10/2008 | Li et al. | 370/218 |
| 2009/0292942 A1 | 11/2009 | Bhat et al. | |

OTHER PUBLICATIONS

Le Roux, et al., "P2MP MPLS-TE Fast Reroute with P2MP Bypass Tunnels," draft-ietf-mpls-p2mp-te-bypass-01.txt, Jul. 2007 (14 pages).

Cetin, et al., "Multiprotocol Label Switching (MPLS) Traffic Engineering management Information Base for Fast Reroute," draft-ietf-mpls-fastreroute-mib-07.txt, Mar. 2007 (35 pages).

Pan et al., RFC 4090: "Fast Reroute Extensions to RSVP-TE for LSP Tunnels," May 2005 (36 pages).

Non-Final Office Action for U.S. Appl. No. 11/833,167, mailed Jun. 24, 2009, 13 pages.

U.S. Appl. No. 11/866,861, filed Oct. 3, 2007, Hanif.

"Dijkstra's Shortest Path Algorithm in Java," printed from website http://renaud.waldura.com/doc/java/dijkstra, on Jul. 13, 2007 (12 pages).

Non-Final Office Action for U.S. Appl. No. 11/866,861, mailed Oct. 16, 2009, 20 pages. (Available to the Examiner via PAIR and accordingly not included with this IDS).

Non-Final Office Action for U.S. Appl. No. 11/833,167, mailed on Feb. 3, 2010, 20 pages. (Available to the Examiner via PAIR and accordingly not included with this IDS).

Final Office Action for U.S. Appl. No. 11/866,861, mailed on Apr. 27, 2010, 12 pages. (Available via PAIR).

Final Office Action for U.S. Appl. No. 11/833,167, mailed on Feb. 7, 2011, 22 pages. (available via PAIR).

* cited by examiner

TECHNIQUES FOR DETERMINING LOCAL REPAIR CONNECTIONS

CROSS-REFERENCES TO RELATED APPLICATIONS

The present application herein incorporates by reference for all purposes the entire contents of related U.S. application Ser. No. 11/833,167 titled TECHNIQUES FOR DETERMINING OPTIMIZED LOCAL REPAIR PATHS filed Aug. 2, 2007.

BACKGROUND OF THE INVENTION

The present invention is related to networking and more particularly to techniques for configuring local repair connections for protected connections in a network environment.

Connection-oriented protocols are widely used to transport data across computer networks. In a connection-oriented protocol, a connection is set up between two endpoints in a network, usually prior to data transmission. Network devices at the end points of a connection use a preliminary protocol to establish an end-to-end path traversed by the connection before any data is sent. The preconfigured connection with its associated path is then used to transport data between the end points. Examples of connection-oriented mechanisms include circuit switching protocols such as Asynchronous Transfer Mode (ATM) protocol, frame relay, Multi-Protocol Label Switching (MPLS), and others.

Multi-Protocol Label Switching (MPLS) (also referred to as "tag switching" or "label switching" protocol) is a data-carrying mechanism which emulates some properties of a circuit-switched network over a packet-switched network. It was designed to provide a unified data-carrying service for both circuit-based clients and packet-switching clients which provide a datagram service model. It can be used to carry many different kinds of traffic, including IP packets, as well as native ATM, SONET, and Ethernet frames.

MPLS works by prepending packets with an MPLS header, containing one or more "labels". Switching nodes switch MPLS labeled packets after a Label Lookup/Switch instead of a lookup into the IP routing table. In MPLS, a connection between two end points is referred to as a Label Switched Path (LSP). Signaling protocol such as Label Distribution Protocol (LDP), Resource Reservation Protocol-Traffic Engine (RSVP-TE), Constrain-based Routed LDP (CR-LDP) and others may be used to set up an LSP. Routers in an MPLS LSP are referred to as Label Switching Routers (LSRs). The first router in an LSP is referred to as an ingress router and the last router in an LSP is referred to as an egress router. Routers in between the ingress router and the egress router are referred to as transit LSRs. Forwarding of packets through an LSP is opaque to higher network layers and accordingly an LSP is also sometimes referred to as an MPLS tunnel. LSPs are unidirectional and enable a packet to be label switched through the MPLS network from one endpoint to another.

The ingress router for an LSP is configured to prepend an MPLS header to an incoming packet. The MPLS header comprises a label prepended based upon the appropriate forward equivalence class (FEC) of the packet. The packet with the MPLS header is then forwarded by the ingress router to the next router in the LSP path. The LSRs in the LSP make routing decisions for the packet based upon the label in the MPLS header. LSRs may swap the packet's outer label for another label. In this manner, the packet is label-switched by routers along the LSP. The egress router removes the MPLS header prior to forwarding the packet. In some embodiments, the last label may be popped off by the penultimate router (i.e., the LSR before the egress router).

A connection, such as an LSP in an MPLS network, established using a connection-oriented protocol may be affected due to failure of one or more nodes and/or links in the path traversed by the connection. As a result of such failures, the data transmission along the connection is prone to disruptions. To safeguard against such disruptions along the original preconfigured connection, one or more alternate connections are generally computed to bypass the network failure points along the original connection path. These connections are referred to as "local repair connections". Each local repair connection originates at a start node in the original connection and ends at a node in the original connection that is downstream from the start node. A local repair connection enables data traffic to be rerouted or diverted around a network failure point in the original connection.

Different protocols may use different techniques to set up and maintain local repair connections. For example, RFC 4090 describes techniques to establish backup label-switched paths (LSP) tunnels for local repair of LSP tunnels. These mechanisms enable the redirection of traffic onto a backup LSP tunnel in the event of a failure. RFC 4090 describes two techniques for setting up local repair connections for an MPLS network—a "one-to-one backup" method that creates local repair LSPs for each protected LSP at each potential point of local repair and a "facility backup" method that creates a bypass tunnel to protect a potential failure point; the bypass tunnel can protect a set of LSPs that have similar backup constraints.

The local repair connections may be set up in advance or may be dynamically created as new LSPs are signaled. In embodiments, where the traffic needs to be redirected onto a backup or detour tunnel within a specified time limit (e.g., for voice over IP applications), the computing and signaling for the local repair connections is typically done in advance of the failure and the traffic is redirected onto the local repair connection as close to the failure point as possible.

A connection is said to be protected if at least one local repair connection has been set up for that connection. A node or link in a connection is said to be protected if at least one local repair connection has been configured that does not use that node or link. A connection is said to be protected at a given hop if it has one or multiple associated local repair LSPs (which may be detour LSPs or backup LSPs) originating at that hop.

Conventional techniques for creating local repair connections are however limited and inefficient, especially in the manner in which the paths associated with local repair connections are determined. Consequently, improved local repair connection techniques are desired.

BRIEF SUMMARY OF THE INVENTION

Embodiments of the present invention provide techniques for configuring a local repair connection for a protected connection including determining a path for the local repair connection. The path traversed by a local repair connection may start at a node in the path associated with the protected connection and end at a merge point node in the path associated with the protected connection that is downstream from the start node. In one embodiment, the merge point node may even be more than two hops downstream from the start node in the path associated with the protected connection. The local repair path may include zero or more nodes that are not included in the path associated with the protected connection.

For example, a local repair LSP may be signaled for a protected LSP in an MPLS network. Techniques are also described for optimizing the path associated with a local repair connection.

According to an embodiment of the present invention, techniques are provided for facilitating creation of a local repair connection for a first connection. The first connection may traverse a first path comprising a plurality of nodes. In one embodiment, a second path is determined from a first node in the first path to a second node in the first path. The second node is a node that is at least three nodes downstream from the first node in the first path. The second path is such that a next-hop node to the first node in the first path and a next-next-hop node to the first node in the first path are not included in the second path.

Once the second path has been determined, a second connection may be signaled for the second path. The second connection is a local repair connection for the first connection and is usable for diverting data from the first path at the first node and merging the diverted data back to the first path at the second node.

The first and the second connections may use connection-oriented protocols for data communication. In one embodiment, data may be communicated using a label switching protocol. For example, the label switching protocol may be Multi-Protocol Label Switching (MPLS) and the first connection and the second connection may be label switched paths (LSPs).

In one embodiment, in order to determine the second path, processing may be performed that includes determining that a path, which does not include the next-hop node to the first node in the first path and a next-hop link to the first node in the first path, cannot be established from the first node to the next-next-hop node to the first node in the first path, and determining that a path, which does not include the next-hop link to the first node in the first path, cannot be established from the first node to the next-hop node to the first node in the first path. The processing may also include determining if a path can be established from the first node to any node in the first path that is downstream from the next-next-hop node to the first node in the first path.

In one embodiment, processing may be performed to optimize the path associated with a local repair connection. For example, determining the second path may include first determining a third path from the first node in the first path to a third node in the first path, wherein the third node is upstream to the second node in the first path. The second path may then be determined from the third path. Various optimization techniques may be used to determine the second path from the first path. In one embodiment, the second path is such that the third path comprises at least one node that is not included in the second path. In another embodiment, the second path is such that a number of nodes from the first path that are in the second path is less than a number of nodes from the first path that are in the third path.

According to an embodiment of the present invention, techniques are provided for protecting a first connection configured using a connection-oriented protocol for communicating data from an originating node to a destination node, the first connection traversing a first path comprising a plurality of nodes. Information may be received identifying a node from the first path to be protected. A second path may be determined from a first node in the plurality of nodes of the first path to a second node in the plurality of nodes of the first path, wherein the first node is upstream from the node to be protected in the first path, wherein the second node is a node that is downstream from the node to be protected in the first path and is downstream from a next-next-hop node to the first node in the first path, and wherein the second path does not include a next-hop node to the first node in the first path and a next-next-hop node to the first node in the first path. A second connection may then be signaled for the second path, wherein the second connection is usable for routing data from the first path at the first node and merging the routed data back to the first path at the second node. The connection-oriented protocol may be Multi-Protocol Label Switching (MPLS).

In one embodiment, the second path is determined by determining a third path from the first node in the first path to a third node in the first path, wherein the third node is upstream to the second node in the first path, and determining the second path from the third path such that at least one node that is included in both the third path and in the first path is not included in the second path.

According to an embodiment of the present invention, techniques are provided for facilitating creation of a local repair connection for a first connection, the first connection traversing a first path comprising a plurality of nodes. A second path may be determined from a first node in the first path to a second node in the first path, wherein the second node is a node that is downstream from the first node in the first path. A third path may be determined from the second path, wherein at least one node that is included in both the first path and in the second path is not included in the third path. A connection may then be signaled using the third path.

Various optimization techniques may be used to determine the third path from the second path. In one embodiment, determining the third path comprises determining a path from the first node to a third node in the first path, wherein the third node is downstream from the second node in the first path. Determining the third path may comprise determining a path wherein at least one node that is included in both the second path and the first path is not included in the third path. The second path may comprise at least one node that is not included in the third path.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
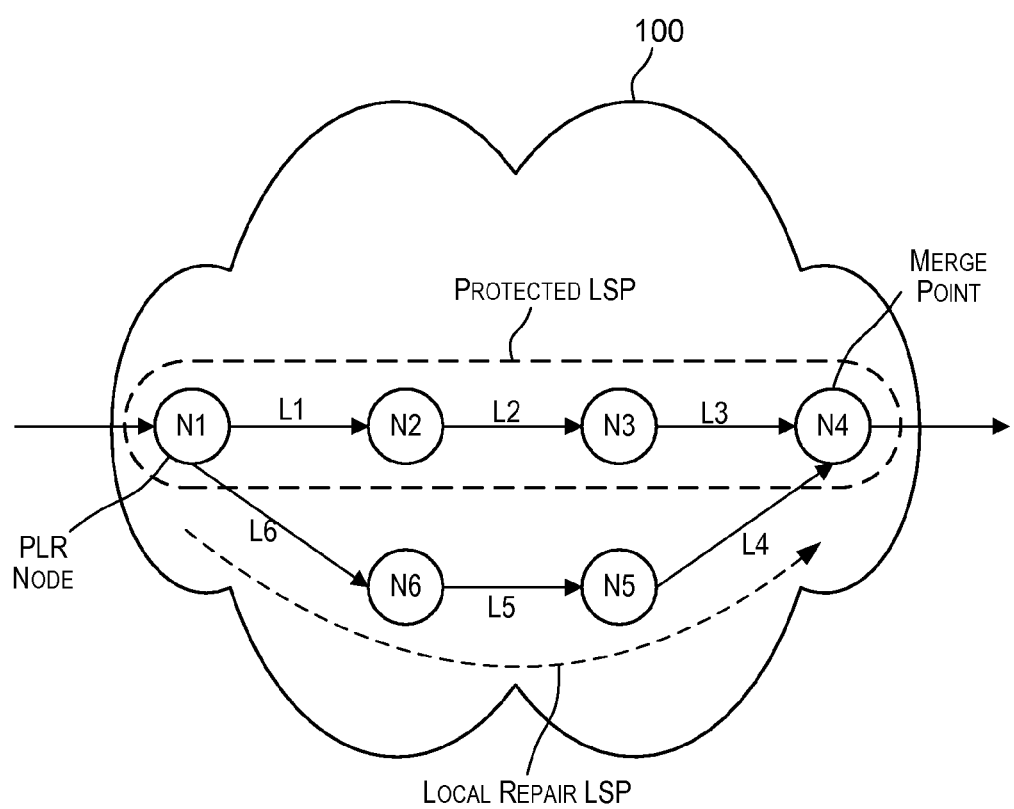
FIG. 1 is a simplified diagram of a network that may incorporate an embodiment of the present invention.

FIG. 1 is a simplified diagram of a network 100 that may incorporate an embodiment of the present invention. Network 100 may use a connection-oriented protocol for data transmission. As previously described, in a network using a connection-oriented protocol, a connection is set up between two endpoints in the network prior to data transmission using that connection. Network devices at the end points of a connection use a preliminary protocol to establish an end-to-end connection before any data is sent. The connection has an associated path between the two end points comprising multiple nodes and links between the nodes. The preconfigured connection is then used to transport data between the end points. Examples of connection-oriented mechanisms include circuit switching protocols such as Asynchronous Transfer Mode (ATM) protocol, frame relay, Multi-Protocol Label Switching (MPLS), and others.

Network 100 may be part of a larger network in which data is transmitted using connection-oriented, connectionless protocols, or other types of protocols. Network 100 may also be capable of transmitting data using a connectionless or other type of protocol in addition to a connection-oriented protocol. In the embodiment depicted in FIG. 1, network 100 uses an MPLS protocol for forwarding of data between two end points. The present invention is however not limited to the MPLS protocol. Teachings of the present invention may also be applied to other protocols where a connection is set up between two end points and used to communicate data between the end points.

Network 100 depicted in FIG. 1 comprises multiple nodes and links connecting the nodes. The nodes in FIG. 1 are identified as N<number> and links between the nodes are identified by L<number>. A node may be any device that is capable of forwarding data. For example, a node may be a network device such as a switch, a router, and the like. A link may be a physical wire connecting ports of two nodes or a wireless link. Links may have different capacities such as 10/100 Mbps, 1 Gbps, 10 Gbps, and so on.

In the embodiment depicted in FIG. 1, the MPLS protocol is used to establish a connection between end nodes N1 and N4. In MPLS, the connection is referred to as an LSP and is set up prior to transmission of data using that LSP. An LSP is unidirectional and starts at an ingress node and ends at an egress node. Various techniques may be used to set up the LSP. As part of the set up, a path or route to be traversed by the LSP from the ingress node to the egress node is determined. The path includes a list of node/link pairs from the ingress node (originating node) to the egress (destination) node. An LSP is then signaled for the determined path. Different algorithms may be used to determine a path from the ingress node to the egress node for an LSP such as Shortest Path First (SPF) algorithms, Constrained Shortest Path First (CSPF) algorithm, and others.

In the example depicted in FIG. 1, an LSP may be configured between nodes N1 and N4 having a path N1-L1-N2-L2-N3-L3-N4. The path may be configured using an algorithm such as the CSPF algorithm and satisfy one or more constraints such as bandwidth, cost, and the like. The LSP comprises a list of node/link pairs from originating or ingress node N1 to the destination or egress node N4. The LSP carries data traffic from ingress node N1 to egress node N4 via link L1, LSR N2, link L2, LSR N3, and link L3. Once an LSP has been set up, the LSP is used to transmit data from the ingress node to the egress node (in FIG. 1 from N1 to N4) along the preconfigured path. The egress node may then transmit the data to another device or network.

As indicated above, in MPLS, an LSP is unidirectional. This implies that data flows along the LSP only in one direction from an ingress or originating node to the egress or destination node. A separate LSP has to be set up for transmitting data in the opposite direction.

One or more local repair connections may be set up for a connection in order to safeguard against network outages or disruptions that may be caused by failure of one or more links and/or nodes in the connection. The connection that is provided protection by one or more local repair connections is referred to as a protected connection. The path traversed by a protected LSP is referred to as the original path or OPATH. A node or link in a path associated with the protected connection is considered protected if a local repair connection exists that enables traffic to be routed along the local repair connection such that the protected node or link is avoided. The path traversed by a local repair LSP is referred to as a local repair path or LPATH. The LPATH for a local repair connection may comprise zero or more nodes that are not included in the OPATH associated with the protected connection.

A local repair LSP may be configured to protect one or more nodes or links in the OPATH associated with a protected LSP. A local repair LSP protecting a node or link in the OPATH has an associated local path (referred to as LPATH) that starts at a node in the OPATH that is upstream from the node or link to be protected and merges back with a node in OPATH that is downstream from the node or link to be protected. For a connection or LSP, a first node is considered to be upstream to a second node if traffic flows from the first node to the second node. The second node is considered to be downstream to the first node if traffic flows from the first node to the second node. The head-end node of a local repair LSP (i.e. the first node in the LPATH) is referred to as a Point of Local Repair (PLR). The PLR is a node in the OPATH of the protected LSP where the local repair LSP originates. The node in the OPATH where a local repair LSP rejoins the original protected LSP is known as the merge point (MP) or merge point node (MN). A merge point node is always some node that is downstream to the PLR in the OPATH.

A local repair LSP enables traffic to be routed around the protected node or link. In the event of a failure of a node or link, the local repair LSP protecting that node or link enables traffic to be rerouted from a node (the PLR) upstream of the network failure to a node (merge point node) downstream from the failure at which point the rerouted traffic is merged back to the OPATH.

Referring to FIG. 1, the LSP from node N1 to node N4 and having an OPATH N1-L1-N2-L2-N3-L3-N4 may be designated as a protected LSP and one or more local repair LSPs (which may be detour or backup LSPs) may be configured for the protected LSP. For example, a local repair LSP may be set up to protect node N2 in the OPATH. The LPATH for such a local repair LSP may start at node N1 and merge with the OPATH at node N3 or node N4. As depicted in FIG. 1, one such local repair LSP may be established having an associated LPATH N1-L6-N6-L5-N5-L4-N4, where node N1 is the PLR and node N4 is the merge point node where the local repair LSP rejoins the protected LSP. In one embodiment, processing to establish a local repair LSP may be performed or initiated by the PLR node.

In the above example, when node N2 fails, PLR node N1 may reroute the traffic along the local repair LSP. In this manner, failed node N2 is avoided and the traffic merges back into the OPATH of the protected LSP at node N4 that is downstream from node N2. The local repair LSP thus enables traffic to be routed around the failure point and back to the protected LSP at a point that is downstream from the failure point.

Local repair connections (e.g., local repair LSPs) for a protected connection (e.g., a protected LSP) may be set up in advance before the protected connection is used to transmit data. Local repair connections may also be set up dynamically as new protected connections are signaled. Advance setup of local repair connections is typically done in applications where the data has to be forwarded within certain specified time limits. In such applications (e.g., for voice over IP applications), the computing and signaling of local repair connections is done in advance such that the traffic can be redirected onto the local repair connection within a specified time limit without having to spend time in creating the local repair connection after the occurrence of a network failure.

Processing for setting up local repair connections may be performed by one or more nodes in the OPATH of the protected connection. For example, a PLR node may be configured to determine local repair connections for all connections protected by the PLR node. In alternative embodiments, a local repair connection may also be set up by other nodes or systems that are configured to provision and set up network connections. In one embodiment, a local repair connection may be set up for every node and link in a protected connection.

Figure 2:
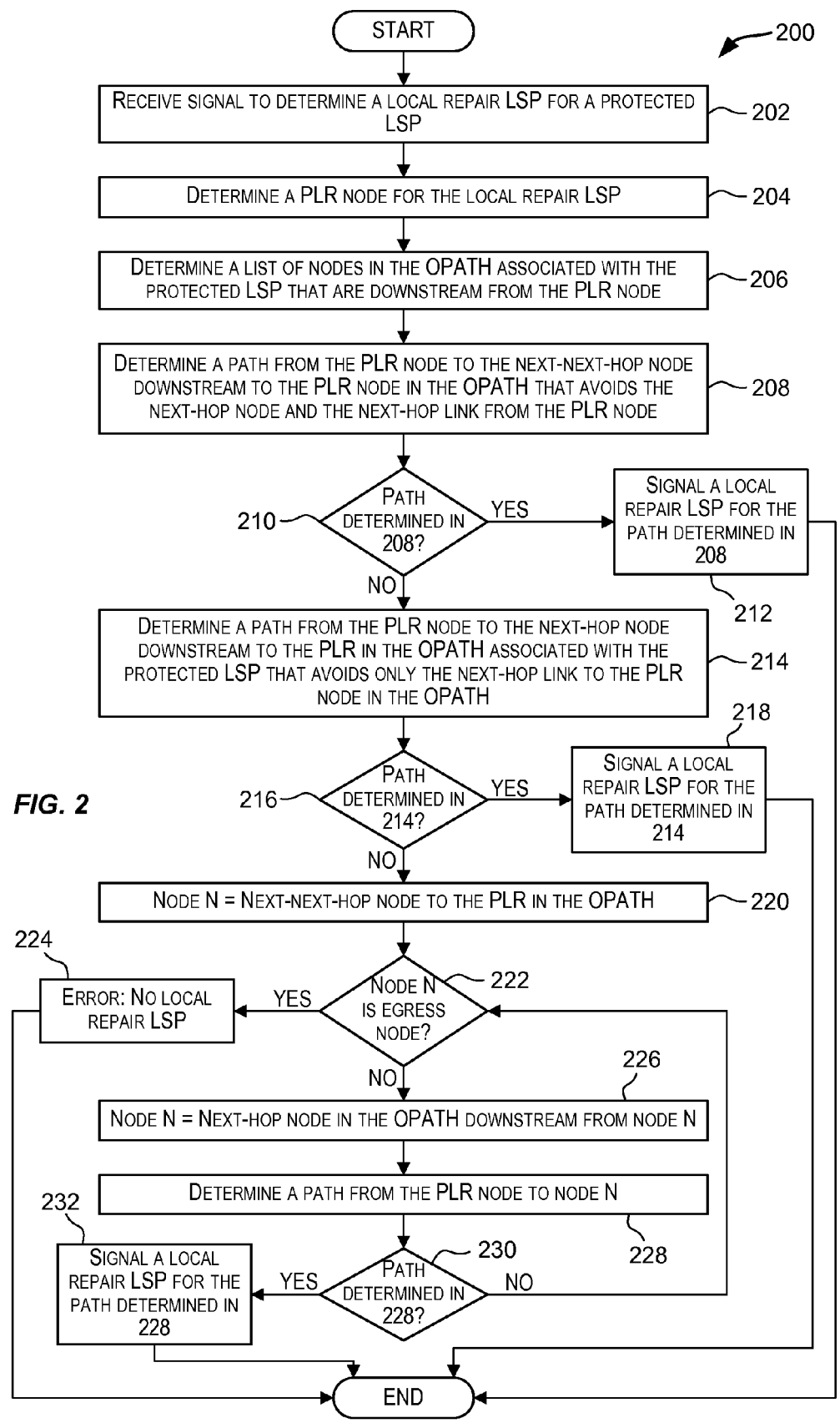
FIG. 2 depicts a simplified flowchart showing a method for computing a local repair LSP according to an embodiment of the present invention.

FIG. 2 depicts a simplified flowchart 200 showing a method for computing a local repair LSP according to an embodiment of the present invention. The processing depicted in FIG. 2 may be performed by software modules (e.g., code or instructions executed by a processor), hardware modules, or combinations thereof. In one embodiment, the processing is performed by a PLR node. The processing may also be performed by other systems or devices.

As depicted in FIG. 2, processing may be initiated upon receiving a signal to create or determine a local repair LSP for a protected LSP (step 202). The signal in 202 may be received under various different circumstances. In one embodiment, the signal may be received when a particular LSP is tagged as a protected LSP and creation of a local repair LSP is requested for the protected LSP. The node or link of the protected LSP to be protected may also be identified. In another embodiment, the signal may be received whenever a new LSP is provisioned. In yet other embodiments, the signal may be received when a failure of a node and/or link is detected along an LSP.

A PLR node for the local repair LSP is then determined (step 204). In one embodiment, information may be provided identifying the OPATH associated with a protected LSP and the node(s)/link(s) in the OPATH that are to be protected by the local repair LSP. This information may then be used to determine the PLR node for the local repair LSP. Using the example network depicted in FIG. 1, information may be received identifying the OPATH for the protected LSP along with information that node N2 is to be protected. Based upon this information, in 204, it may be determined that the PLR node is node N1. As previously indicated, a PLR node is a node where the local repair originates and is a node in the OPATH that is upstream from the node or link to be protected. The information related to the protected LSP and the nodes/links to be protected may be received in step 202. In another embodiment, information may be received identifying a point of network failure and this information may then be used in 204 to identify a PLR node for the local repair LSP.

A list of nodes in the OPATH associated with the protected LSP that are downstream from the PLR are then determined (step 206).

Processing is then performed to determine a path from the PLR node to the next-next-hop node downstream to the PLR node in the OPATH associated with the protected LSP that avoids the next-hop node and the next-hop link from the PLR node (step 208). A next-next-hop node to the PLR node is a node in the OPATH that is two hops downstream (also referred to as two nodes downstream) from the PLR node in the OPATH. A next-hop node to the PLR node is a node in the OPATH that is one hop downstream (also referred to as one node downstream) from the PLR node in the OPATH. A next-hop link to the PLR node is a link that is connected to the PLR and downstream from the PLR node in the OPATH. For example, for the network depicted in FIG. 1, node N3 is the next-next-hop node to node N1, node N2 is the next-hop node to node N1, and link L1 is the next-hop link to node N1. Accordingly, in 208 an attempt is made to find a path from node N1 to node N3 that avoids N2 and L1.

A check is then made to see if a path was successfully determined in 208 (step 210). If it is determined in 210 that a path was successfully determined in 208, then a local repair LSP is signaled for the path determined in 208 (step 212) and processing ends. The path determined in 208 thus becomes the LPATH associated with the local repair LSP. Given an LPATH, the local repair LSP may be signaled using known MPLS signaling techniques.

If it is determined in 210 that a path could not be determined from the PLR to the next-next-hop node in 208, then processing is performed to determine a path from the PLR node to the next-hop node downstream to the PLR in the OPATH associated with the protected LSP that avoids only the next-hop link to the PLR node in the OPATH associated with the protected LSP (step 214). For example, for the network depicted in FIG. 1, an attempt is made to find a path from node N1 to node N2 that avoids link L1. A check is then made to see if a path was successfully determined in 214 (step 216). If it is determined in 216 that a path was successfully determined in 214, then a local repair LSP is signaled for the path determined in 214 (step 218) and processing ends. The path determined in 214 becomes the LPATH associated with the local repair LSP. Given the LPATH, the local repair LSP may be signaled using known MPLS signaling techniques.

According to an embodiment of the present invention, if a LSP cannot be established to the next-next-hop node or to the next-hop node downstream from the PLR, then the local repair path computation continues with an effort to find a local repair LSP from the PLR node to other downstream nodes in the OPATH associated with the protected LSP beyond the next-next-hop node.

Accordingly, if it is determined in 216 that a path from the PLR to the next-hop node to the PLR node in the OPATH could not be determined, then the next-next-hop node to the PLR in the OPATH is identified as node "N" (step 220). Using the network depicted in FIG. 1 as an example, node N3 is identified as node N.

A check is then made to see if node N is the egress node or endpoint node for the protected LSP (step 222). If it is determined in 222 that node N is the egress node for the protected LSP, then it implies that all the nodes in the OPATH downstream from the PLR have been considered for merge points for the local repair path and that a local repair path could not be found to any of the OPATH nodes downstream from the PLR. An error condition may then be output indicating that a local repair LSP could not be established for the protected LSP (step 224).

If it is determined in 222 that node N is not the egress node, then the next-hop node in the OPATH downstream from node N is tagged as node N (step 226). Processing is then performed to find a path from the PLR node to the node N (step 228). As a result, processing is performed in 228 to find a path for a local repair LSP that does not include any nodes between the PLR and node N that are in the OPATH and are downstream to the PLR node. Using the network depicted in FIG. 1 as an example, an attempt is made to find a path from N1 (the PLR node) to node N4.

A check is then made to see if a path was successfully determined in 228 (step 230). If it is determined in 230 that a path was successfully determined in 228, then a local repair LSP is signaled for the path determined in 228 (step 232) and processing ends. The path determined in 228 becomes the LPATH associated with the local repair LSP. Given an LPATH, the local repair LSP may be signaled using known MPLS signaling techniques. If it is determined in 230 that a path could not be determined in 228, then processing continues with step 222.

In the manner above, processing is performed to find a local repair LSP from the PLR node to a node downstream to the PLR in the OPATH. If a local repair path cannot be found to a next-next-hop node or next-hop from the PLR node, processing continues to find a path from the PLR node to other nodes in the OPATH that are downstream from the next-next-hop node, where the determined path does not include the next-hop and next-next-hop nodes. In this manner, nodes in the OPATH that are more than two (or at least three) nodes downstream from the PLR node are also considered as possible merge points for the local repair path. The processing continues until a local repair path is found or until all nodes in the OPATH have been considered as merge points for the local repair path.

If the local repair LSP is being generated to protect a particular node in the OPATH, then the LPATH is generated such that the PLR node is a node in the OPATH that is upstream from the node to be protected and the merge point node of the LPATH is a node in the OPATH that is downstream from the node to be protected.

The processing depicted in FIG. 2 and described above is not limited to MPLS. The technique described above may also be used for determining local repair connections in other types of connection-oriented networks or networks in which a connection is set up prior to use of the connection for data communication. The technique described above may be used not only to find local repair connections from a PLR node to the next-hop node or the next-next-hop node to the PLR but also to other nodes in the original path of the protected connection that are beyond the next-next-hop node. This is especially useful in networks such as ring topology networks.

Several different algorithms may be used for determining a path from a PLR node to another node as done in steps 208, 214, and 228. In one embodiment, a CSPF algorithm may be used. The CSPF algorithm may determine a path that meets one or more constraints such as bandwidth constraints, cost constraints, availability constraints, number of hops constraints, etc.

Applying the method depicted in FIG. 2 and described above to the protected LSP depicted in FIG. 1, information may be received in 202 that a local repair LSP is to be set up to protect node N2 of the protected LSP. In 204, node N1 may be determined to be the PLR node. A list of nodes N2, N3, and N4 that are downstream to the PLR node may be determined in 206. Processing may then be performed according to 208 to find a path from N1 to N3, which is the next-next hop node to PLR node N1. Such a path may be determined to be N1-L6-N6-L5-N5-L4-N4-L3-N3, where node N3 is the merge point for the local repair LSP. A local repair LSP may then be signaled using LPATH N1-L6-N6-L5-N5-L4-N4-L3-N3.

It is evident however that this LPATH N1-L6-N6-L5-N5-L4-N4-L3-N3 is not very efficient since traffic has to travel from N4 to N3 in the LPATH and merge with the OPATH at N3 and then have to travel back from N3 to N4 in the OPATH. Accordingly, even though this local repair LSP protects node N2 (i.e., enables traffic to be routed around node N2), the LPATH of the local repair LSP it is not the most efficient and optimal path for protecting node N2. For example, for the network depicted in FIG. 3, a more efficient local repair LSP is one having an LPATH as N1-L6-N6-L5-L4-N4 which not only protects node N2 but also avoids the forward and backward transmission of traffic over link L3, which is a common link to the OPATH and the LPATH.

Various optimization techniques may be used to optimize a path (LPATH) associated with a local repair LSP. According to one optimization technique, the local repair path determined for a protected LSP is optimized by finding a path that minimizes the number of nodes in the LPATH that are also in the OPATH of the protected LSP. Given that an LPATH originates and ends in nodes of the OPATH, at a minimum two nodes from the OPATH are also included in the LPATH, namely the PLR node and the merge point node. Optimization may be performed such that overlapping nodes in the OPATH and the LPATH are kept as close to two nodes as possible.

Figure 3:
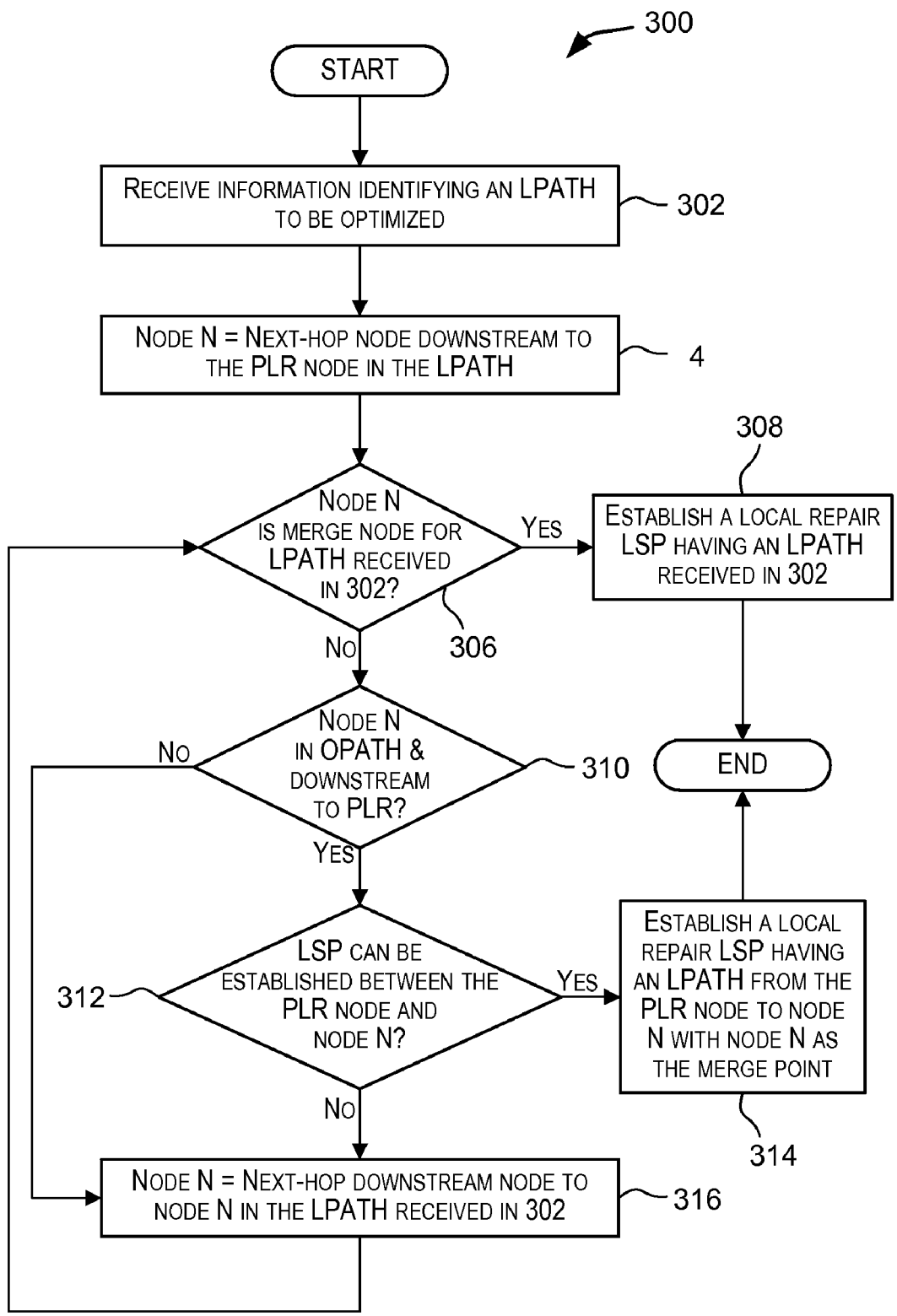
FIG. 3 depicts a simplified flowchart showing a method of optimizing a local repair path according to an embodiment of the present invention.

FIG. 3 depicts a simplified flowchart 300 showing a method of optimizing a local repair path according to an embodiment of the present invention. The processing depicted in FIG. 3 may be performed by software modules (e.g., code or instructions executed by a processor), hardware modules, or combinations thereof. In one embodiment, the processing is performed by a PLR node. The processing may also be performed by other systems or devices.

As depicted in FIG. 3, information is received identifying an LPATH that is to be optimized (step 302). The next-hop downstream node to the PLR node in the LPATH is marked as a node "N" (step 304). A check is then made to see if node N is a merge point node for the LPATH received in 302 (step 306). Accordingly, a check is made in 306 if node N is the last node in the LPATH. If it is determined in 306 that node N is the merge point node for the LPATH, it indicates that all the nodes in the LPATH up to the merge point node have been considered in an effort to determine an optimized LPATH without any success. In this scenario, a local repair LSP is signaled for the local repair path received in 302 (step 308). Given an LPATH, the local repair LSP may be signaled using known MPLS signaling techniques.

If it is determined in 306 that node N is not a merge point node, then a check is made if node N is included in the OPATH associated with the protected LSP and is downstream to the PLR node (step 310). If the node N is not in the OPATH then processing continues with step 316 wherein the next-hop downstream node to node N in the LPATH received in 302 is marked as the new node N (step 316). If node N is determined in 310 to be in the OPATH then, a determination is made if an LSP can be established between the PLR node and node N (step 312). If it is determined in 312 that an LSP can be established between the PLR node and the node N, then a local repair LSP having an LPATH from the PLR node to node N is established with node N as the merge point (step 314) and processing ends. The local repair LSP established in 314 has an optimized path that originates at the PLR node and merges with the OPATH of the protected LSP at node N. Given an LPATH, the local repair LSP may be signaled using known MPLS signaling techniques. If it is determined in 312 that an LSP cannot be established between the PLR node and node N, then processing continues with step 316.

In the manner depicted in FIG. 3 and described above, a local repair path determined for a protected LSP is optimized and the local repair LSP is then signaled for the optimized path. The local repair LSP with the optimized LPATH is then used to reroute the network traffic. As part of the optimization technique, an optimized LPATH is determined from the unoptimized LPATH such that the number of nodes that are both in the OPATH of the protected LSP and in the optimized LPATH is less than the number of nodes that are both in the OPATH of the protected LSP and the unoptimized LPATH. Accordingly, the number of nodes from the OPATH that are in the optimized LPATH is less than a number of nodes from the OPATH that are in the unoptimized LPATH. The unoptimized LPATH comprises at least one node that is not included in the optimized LPATH. In one embodiment, the number of nodes in the LPATH that are also in the OPATH is minimized as part of the optimization processing.

The optimization technique depicted in FIG. 3 may be used to optimize the LSP LPATH N1-L6-N6-L5-N5-L4-N4-L3-N3 determined for network 300 depicted in FIG. 3. Traversing the LPATH starting from node N1 towards node N3, it is determined that node N4 is the first node in the LPATH that is also included in the OPATH for the protected LSP and is downstream to the PLR node N1. A determination is made if a local repair LSP can be established between PLR node N1 and node N4. If such a LSP can be established, then a local repair LSP is signaled for the optimized LPATH N1-L6-N6-L5-N5-L4-N4. In this manner, an original local repair LPATH N1-L6-N6-L5-N5-L4-N4-L3-N3 is optimized to an optimized LPATH N1-L6-N6-L5-N5-L4-N4, which is then used for signaling the local repair LSP.

An LPATH may also be optimized based upon other factors such as bandwidth, availability, number of hops, and the like. Various different criteria may be used for optimization.

Figure 4:
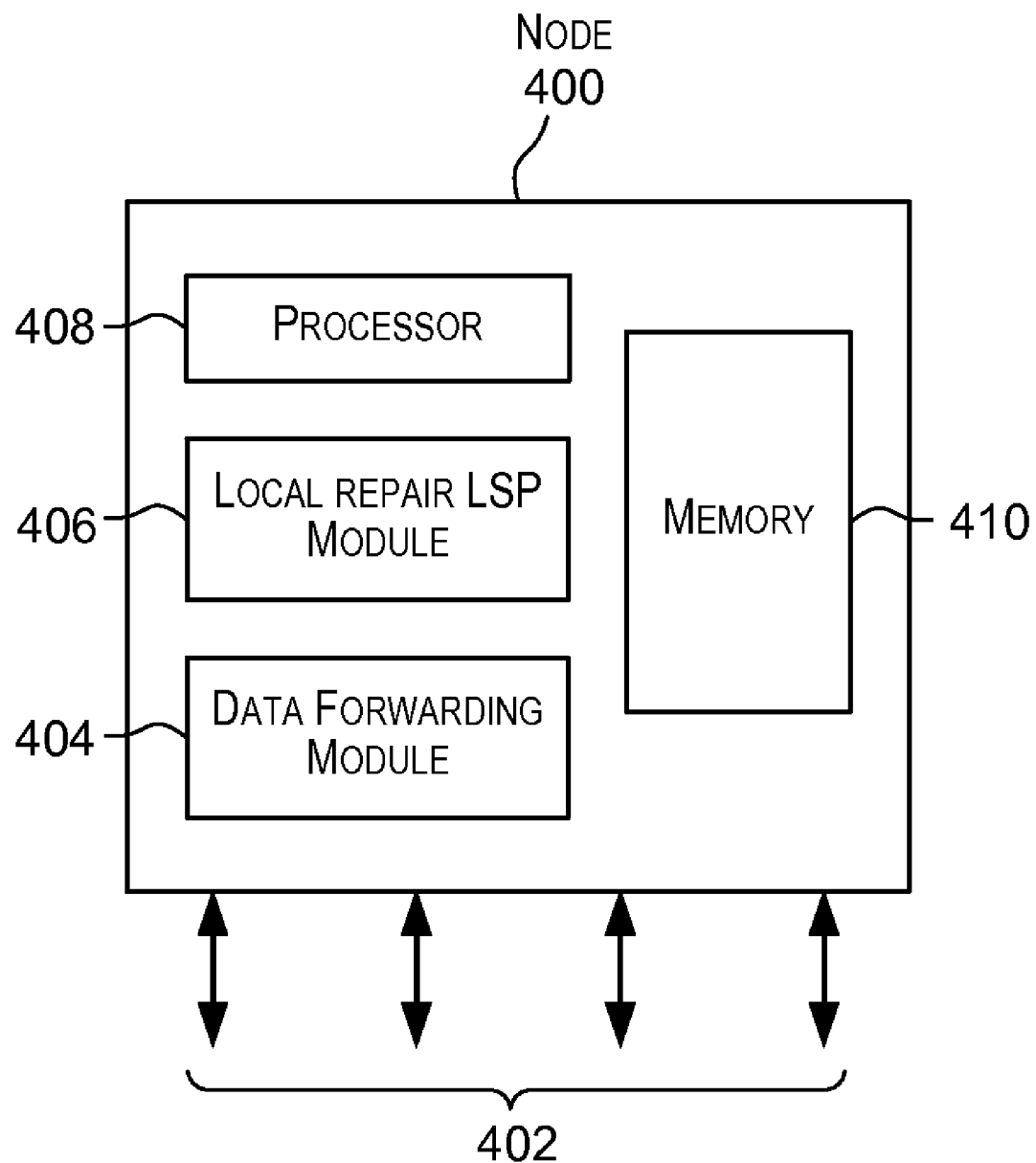
FIG. 4 is a simplified block diagram of a network node that may perform processing to set up and optimize local repair LSPs according to an embodiment of the present invention.

FIG. 4 is a simplified block diagram of a network node 400 that may perform processing to set up and optimize local repair LSPs according to an embodiment of the present invention. Node 400 may be embodied as a network device such as a switch or router, such as routers and switches provided by Foundry Networks®, Inc. of Santa Clara, Calif.

As depicted in FIG. 4, node 400 comprises multiple physical ports 402, a data forwarding module 404, a local repair LSP module 406, a processor 408, and memory 410. The modules may be implemented in software, hardware, or combinations thereof. Node 400 depicted in FIG. 4 illustrates a node incorporating an embodiment of the present invention and is not intended to limit the scope of the present invention. The structure of node 400 may be different in other embodiments of the present invention.

Node 400 receives data packets via one or more ports 402. Data is forwarded from node 400 to other links or nodes in the network via ports 402. Data forwarding module 404 is configured to perform processing to facilitate the forwarding of data packets received by node 400. Data forwarding module may be configured to process a data packet received by node 400, determine a destination port of node 400 to which the packet is to be forwarded, and forward the packet to the determined destination port. In an ingress node, data forwarding module 404 may be configured to receive a packet, prepend an MPLS header with a label to the packet based upon the FEC of the packet, determine an LSP for the packet, and then forward to a port connected to a link to the next node in the LSP for the packet. In an egress node or in a penultimate node, data forwarding module 404 may be configured to remove the MPLS header from a packet prior to forwarding the packet. In an LSR node, data forwarding module 404 may be configured to swap labels in the MPLS header prepended to the packet and make forwarding decisions based upon the MPLS label of the packet. An LSR node may forward the packet to a port connected to a link to the next node in the LSP for the packet. Data forwarding module 404 may use information (e.g., LSP information, FEC information, etc.) stored in memory 410 for data forwarding.

Data forwarding module 404 may be configured to perform forwarding functions. Data forwarding module 404 may comprise hardware, software components, or combinations thereof. In one embodiment, data forwarding module 404 comprises one or more line cards and a switching fabric. The line cards and switching fabric are used to forward data packets from one input port of node 400 to an output port of node 400. The hardware components may include ASICs, FPGAs, circuitry, and the like. The software components may include programs comprising code or instructions that are executed by processor 408 or by a processor within data forwarding module 404.

Data forwarding module 404 may also be configured to reroute data traffic along a local repair LSP to protect a link and/or node of a protected LSP. For example, node 400 may be a PLR node that is configured to reroute network traffic along a local repair connection originating at the PLR node. Information related to local repair LSPs such as LPATHs associated with the local repair LSPs may be stored in memory 410 and used by data forwarding module 404.

Local repair LSP module 406 is configured to perform processing related to determining optimized LPATHs and setting up local repair LSPs or connections using the LPATHS. For example, module 406 may be configured to perform the processing depicted in FIGS. 2 and 3, and described above. Information that is used for creation of LSPs and optimization of LPATHs may be stored in memory 410.

Local repair LSP module 406 may comprise hardware components, software components, or combinations thereof. The hardware components may include ASICs, FPGAs, circuitry, and the like. The software components may include code or instructions that are executed by processor 408 or by processor within module 406. In one embodiment, module 406 may be part of module 404.

Processor 408 is configured to perform processing for tasks performed by node 400. Processor 408 may execute software programs comprising code and instructions to perform the tasks. Processor 408 may also aid modules 406 and 404 in functions performed by those modules. In one embodiment, processor 408 may be configured to perform the functions performed by modules 404 and 406 such as data forwarding, creation of local repair LSPs, optimization of LPATHs, and the like.

Memory 410 acts as a repository for storing data that is used by node 400. For example, memory 410 may store information related to various LSPs. Memory 410 may also stored network topology information that is used for determining local paths associated with local repair LSPs. For example, information regarding various connections and associated OPATHs may be stored in memory 410. Information related to local repair LSPs may also be stored in memory 410. Memory 410 may also store programs comprising software code or instructions that are executed by processor 408 and/or by the other modules of node 400. For example, code or instructions which when executed by a processor cause the processor (or modules 404 and 406) to determine local repair LSPs and optimize local paths, as described above, may be stored in memory 410.

Processing according to the teachings of the present invention may also be performed by a device, a system, or an apparatus in a networked or non-networked environment (i.e., standalone embodiment).

While an MPLS-based network has been used to illustrate features of the present invention, the scope of the present invention as recited in the claims is not limited to MPLS. Teachings of the present invention may be applied to any type of network protocol in which a connection between two endpoints is set up and then used to transport data between the end points. Examples include connections set up using connection-oriented protocols. Local repair connections may be set up, as described above, to protect one or more nodes/links in such connections.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method of facilitating creation of a local repair connection for a first connection, the first connection traversing a first path comprising a plurality of nodes, the method comprising:

determining, by a network device, whether a second path can be established from a first node in the first path to a next-next-hop node to the first node in the first path, where the second path does not include a next-hop node to the first node in the first path and a next-hop link to the first node in the first path;

upon determining that the second path cannot be established, determining, by the network device, whether a third path can be established from the first node to the next-hop node to the first node in the first path, where the third path does not include the next-hop link to the first node in the first path; and upon determining that the third path cannot be established, determining, by the network device, a fourth path from the first node to a second node in the first path, where the second node is downstream from the next-next-hop node to the first node in the first path, wherein data is communicated via the first connection using Multi-Protocol Label Switching (MPLS) protocol and the first connection is a label switched path (LSP).

2. The method of claim 1 further comprising causing a second connection to be signaled for the fourth path, wherein the second connection is a local repair connection for the first connection and is usable for diverting data from the first path at the first node and merging the diverted data back to the first path at the second node.

3. The method of claim 1 wherein determining the fourth path comprises:

determining a fifth path from the first node in the first path to a third node in the first path, wherein the third node is upstream to the second node in the first path; and determining the fourth path from the fifth path.

4. The method of claim 3 wherein determining the fourth path from the fifth path comprises determining the fourth path wherein the fifth path comprises at least one node that is not included in the fourth path.

5. The method of claim 3 wherein determining the fourth path from the fifth path comprises determining the fourth path such that a number of nodes from the first path that are in the fourth path is less than a number of nodes from the first path that are in the fifth path.

6. A system for facilitating creation of a local repair connection for a first connection, the first connection traversing a first path, the system comprising:

a memory configured to store information for the first connection; and a processor configured to, based upon information stored in the memory:

determine whether a second path can be established from a first node in the first path to a next-next-hop node to the first node in the first path, where the second path does not include a next-hop node to the first node in the first path and a next-hop link to the first node in the first path;

upon determining that the second path cannot be established, determine whether a third path can be established from the first node to the next-hop node to the first node in the first path, where the third path does not include the next-hop link to the first node in the first path; and upon determining that the third path cannot be established, determine a fourth path from the first node to a second node in the first path, where the second node is downstream from the next-next-hop node to the first node in the first path, wherein data is communicated via the first connection using Multi-Protocol Label Switching (MPLS) protocol and the first connection is a label switched path (LSP).

7. The system of claim 6 wherein the processor is configured to cause a second connection to be signaled for the fourth path, wherein the second connection is a local repair connection for the first connection and is usable for diverting data from the first path at the first node and merging the diverted data back to the first path at the second node.

8. The system of claim 6 wherein the processor is configured to:

determine a fifth path from the first node in the first path to a third node in the first path, wherein the third node is upstream to the second node in the first path; and determine the fourth path from the fifth path.

9. The system of claim 8 wherein the processor is configured to determine the fourth path wherein the fifth path comprises at least one node that is not included in the fourth path.

10. The system of claim 8 wherein the processor is configured to determine the fourth path such that a number of nodes from the first path that are in the fourth path is less than a number of nodes from the first path that are in the fifth path.

11. The system of claim 8 included in a switch.

* * * * *

UNITED STATES PATENT AND TRADEMARK OFFICE
CERTIFICATE OF CORRECTION

| | | |
|---|---|---|
| PATENT NO. | : 8,040,792 B2 | Page 1 of 1 |
| APPLICATION NO. | : 11/833168 | |
| DATED | : October 18, 2011 | |
| INVENTOR(S) | : Mohammad Hanif and Ivy Hsu | |

It is certified that error appears in the above-identified patent and that said Letters Patent is hereby corrected as shown below:

On the Title page, Item (56) in the References Cited Section, U.S. PATENT DOCUMENTS For U.S. Patent No. 6,914,912, please delete "Kasamatsu" and insert -- Skalecki et al. --

Signed and Sealed this
Twenty-ninth Day of January, 2013

David J. Kappos
*Director of the United States Patent and Trademark Office*